United States Patent
Tanaka et al.

(10) Patent No.: US 6,977,708 B2
(45) Date of Patent: Dec. 20, 2005

(54) SUBSTRATE FOR LIQUID CRYSTAL DISPLAY HAVING MULTIPLE TERMINALS CONNECTED TO SEMICONDUCTOR CHIP, AND LIQUID CRYSTAL DISPLAY HAVING THE SAME

(75) Inventors: Yoshinori Tanaka, Kawasaki (JP); Yoji Nagase, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 80 days.

(21) Appl. No.: 10/624,224

(22) Filed: Jul. 22, 2003

(65) Prior Publication Data
US 2004/0119929 A1  Jun. 24, 2004

(30) Foreign Application Priority Data
Jul. 26, 2002  (JP)  .............................. 2002-217569

(51) Int. Cl.$^7$ .......................................... G02F 1/1345
(52) U.S. Cl. ..................................... 349/152; 324/770
(58) Field of Search ............................... 349/149, 151, 349/152; 324/770

(56) References Cited

U.S. PATENT DOCUMENTS 5,742,074 A  *  4/1998  Takizawa et al. ............. 257/59
6,204,081 B1 *  3/2001  Kim et al. ..................... 438/30
6,587,160 B2 *  7/2003  Kim et al. ..................... 349/40

FOREIGN PATENT DOCUMENTS

JP    7-175086       7/1995
JP    11202353 A  *  7/1999   ......... G02F 1/1343

OTHER PUBLICATIONS

Machine-translation of JP 11-202353.*

* cited by examiner

*Primary Examiner*—Andrew Schechter
(74) *Attorney, Agent, or Firm*—Greer, Burns & Crain, Ltd.

(57) ABSTRACT

There is provided a substrate for a liquid crystal display with which static damage to TFT devices can be prevented and a thin frame can be achieved, a liquid crystal display having the same, and a method of manufacturing the same. Terminal sections to which signals are input from the outside and terminal sections for outputting the signals to driver ICs are constituted by a conductive layer different from gate bus lines and a common wiring. Thus, the gate bus lines can be connected to the common wiring through connection wirings even when the common wiring is provided in a location that is removed at a chamfering step. This makes it possible to prevent TFT devices from being damaged by static electricity up to the chamfering step. There is no increase in steps for manufacturing a TFT substrate. Further, since area limitations are reduced by forming the terminal sections, connection wirings and the common wiring as a plurality of conductive layers, it is easy to lay out wirings on the TFT substrate and design a thin frame at a designing step.

4 Claims, 9 Drawing Sheets

SUBSTRATE FOR LIQUID CRYSTAL DISPLAY HAVING MULTIPLE TERMINALS CONNECTED TO SEMICONDUCTOR CHIP, AND LIQUID CRYSTAL DISPLAY HAVING THE SAME

BACKGROUND OF THE INVENTION

1. Field of the Invention

The present invention relates to a substrate for a liquid crystal display used in a display section of an information apparatus, a liquid crystal display having the same, and a method of manufacturing the same.

2. Description of the Related Art

Methods of mounting driver ICs (semiconductor chips) used for operating a liquid crystal display include COG (chip on glass) mounting, TAB (tape automated bonding) mounting, and COF (chip on film) mounting. COG satisfies recent needs for liquid crystal displays with thinner frames because it allows driver ICs for outputting video signals and control signals required for image display to be directly mounted on a glass substrate. Terminals at a signal output end of driver ICs are respectively connected to a plurality of terminal sections through bumps, the terminal sections being connected to a plurality of gate bus lines and drain bus lines extending from a display area. Terminals at a signal input end of the driver ICs are connected to terminal sections through bumps, the terminal sections being connected to FPCs (flexible printed circuits) that are provided separately. Some of the terminals at the signal input end are cascade-connected through in-panel wirings that are formed on a glass substrate.

Common wirings are provided in a liquid crystal display to keep the bus lines at the same potential in order to prevent thin film transistor (TFT) devices from being broken by static electricity generated at manufacturing steps. The common wirings are electrically connected to the bus lines and are provided at ends of a glass substrate.

FIG. 7 is a flow chart showing some of steps for manufacturing a liquid crystal display. First, alignment films are applied to surfaces (opposite surfaces) of a TFT substrate and an opposite substrate that have been fabricated at respective processes (step S1). Next, a rubbing process is performed on the alignment films on both of the substrates as occasions demand (step S2). Then, spacers having a spherical configuration, for example, are dispersed on either substrate (step S3). A sealing material is then applied to the periphery of each of panel forming areas on the other substrate, and the two substrates are combined to fabricate a combined substrate (step S4). Next, each of the two substrates is cut into a predetermined configuration to divide the combined substrate into individual panels (step S5). A liquid crystal is then introduced into and sealed a gap between the combined substrates thus divided to fabricate liquid crystal display panels (step S6).

The liquid crystal panels are then cleaned to remove any portion of the liquid crystal that has stuck to the surface of the liquid crystal display panels, and the panels are dried thereafter (step S7). Next, edges of each substrate are polished to chamfer them in order to prevent cracking and breakage at cut surfaces of the glass substrates (step S8). A polarizer is then applied to each of outer surfaces of the liquid crystal panels (step S9). The polarizers are provided such that their polarization axes are substantially orthogonal to each other. A display inspection is then conducted on the liquid crystal display panels (step S10). Driver ICs are then mounted on a surface of the TFT substrate (step S11). Liquid crystal displays are completed through the above-described steps.

The bus lines must be electrically isolated before the inspection step (step S10) in order to cause the liquid crystal displays to operate properly by inputting predetermined signals to each of the bus lines. Normally, the bus lines are electrically isolated by removing the common wirings at the panel dividing step (step S5) or the chamfering step (step S8). Alternatively, the bus lines are electrically isolated by irradiating the portions where the common wirings and the bus lines are connected with laser light to disconnect them prior to the inspection step.

FIG. 8 shows a configuration of a liquid crystal display according to the related art. As shown in FIG. 8, the liquid crystal display has a TFT substrate 102 and an opposite substrate 104 that are combined together through a sealing member (not shown) applied to the peripheries thereof. The TFT substrate 102 is formed with a plurality of gate bus lines 112 extending in the horizontal direction of the figure and a plurality of drain bus lines 114 extending in the vertical direction of the figure such that they intersect the gate bus lines 112 with an insulation film that is not shown interposed therebetween. Driver IC mounting areas 118 in which a plurality of driver ICs are mounted on a COG basis are provided at the left end of the TFT substrate 102. Terminal sections 116 provided in the driver IC mounting areas 118 are formed at the left ends of the respective gate bus lines 112.

Driver IC mounting areas 124 in which a plurality of driver ICs are mounted on a COG basis are provided at the bottom end of the TFT substrate 102. Terminal sections 122 provided in the driver IC mounting areas 124 are formed at the bottom ends of the respective drain bus lines 114.

FIG. 8 shows common wirings 120 and 126 that have already been removed at the panel dividing step (step S5). The common wiring 120 is provided at the right side of the TFT substrate 102 in the figure and is electrically connected to the gate bus lines 112. The common wiring 126 is provided at the top side of the TFT substrate 102 in the figure and is electrically connected to the drain bus lines 114. Although not shown, the common wiring 120 and the common wiring 126 are electrically connected to each other through a contact hole that is formed by providing an opening in the insulation film, for example.

FPC fitting areas 130 for inputting external signals are formed at the bottom of the driver IC mounting area 124 in the figure. The FPC fitting areas 130 are formed with terminal sections 132 and 133 that are connected to terminals at FPCs. The terminal sections 133 are electrically connected to terminal sections 123 of the driver IC mounting areas 124. The terminal sections 132 are electrically connected to terminal sections 117 of the driver IC mounting area 118 through an in-panel wiring 141. A terminal section 117 of the upper driver IC mounting area 118 in the figure is connected to a terminal section 117' of the lower driver IC mounting area 118 in the figure through an in-panel wiring 140. Thus, a plurality of driver ICs mounted in the driver IC mounting areas 118 are cascade-connected.

The TFT substrate 102 and the opposite substrate 104 are offset at the ends thereof where the driver IC mounting areas 118 and 124 are located to provide a configuration in which a device forming surface of the TFT substrate 102 is exposed.

FIG. 9 shows another configuration of a liquid crystal display according to the related art. As shown in FIG. 9, a common wiring 121 electrically connected to gate bus lines 112 is formed at a side of a TFT substrate 102 where driver IC mounting areas 118 are located. A common wiring 127 electrically connected to drain bus lines 114 is formed at a side of the TFT substrate 102 where driver IC mounting areas 124 are located. Therefore, the inspection step (step S10) must be preceded by operations of irradiating a cutting line α with laser light to cut portions where the gate bus lines 112 and the common wiring 121 are connected and irradiating a cutting line β with laser light to cut portions where the drain bus lines 114 and the common wiring 127 are connected to isolate each of the gate bus lines 112 and each of the drain bus lines 114 electrically.

In the configuration shown in FIG. 8, however, since the common wirings 120 and 126 are disconnected at the panel dividing step (step S5) to electrically isolate the gate bus lines 112 and the drain bus lines 114 from each other, a problem arises in that the TFT devices can be broken by static electricity generated at subsequent steps (e.g., the liquid crystal introducing step (step S6)).

In order to solve this problem, a configuration may be employed in which the common wirings 120 and 126 are provided in regions that are located inside the dividing positions at the panel dividing step and that are removed at the chamfering step (step S8). However, in order to remove the common wirings 120 and 126 at the chamfering step, the TFT substrate 102 and the opposite substrate 104 must be offset also at the ends thereof where the common wirings 120 and 126 are provided to expose the surfaces of the TFT substrate 102 where the common wirings 120 and 126 are formed. This results in a problem in that the size of the TFT substrate 102 is increased to increase the surface area of a frame region of a liquid crystal display.

The configuration shown in FIG. 9 results in a problem in that there is an increase in steps of manufacturing liquid crystal displays because it involves an additional cutting step for electrically isolating the bus lines 112 and 114 by irradiating them with laser light. Another problem arises in that metals that are melt and spread during irradiation with laser light can cause connection defects when driver ICs are mounted.

FIG. 10 shows still another configuration of a liquid crystal display according to the related art. A relatively small number of signals are input to driver ICs at gate bus lines 112 from the outside, and there are a relatively small number of wirings (e.g., a few wirings) that are connected to the same from the outside. Therefore, as shown in FIG. 10, terminal sections 117 in driver IC mounting areas 118 for the gate bus lines 112 can be provided on shorter sides of the driver IC mounting areas 118 (on sides C in FIG. 10). Since this allows the gate bus lines 112 to be extended to the left end of the TFT substrate 102, a common wiring 121 can be provided in a location that is removed at the chamfering step (step S8). It is therefore possible to prevent static damage to TFT devices up to the chamfering step.

However, in the case of a liquid crystal display in which a great number of signals are input to driver ICs at gate bus lines 112 thereof and to which a great number of wirings are connected, shorter sides of driver IC mounting areas 118 have a great width. This results in a problem in that it is difficult to provide a liquid crystal display with a thin frame.

SUMMARY OF THE INVENTION

It is an object of the invention to provide a substrate for a liquid crystal display with which static damage to TFT devices can be prevented and with which a thin frame can be provided, a liquid crystal display having the same, and a method of manufacturing the same.

The above-described object is achieved by a substrate for a liquid crystal display, characterized in that it has first bus lines formed in parallel with each other on a base substrate; second bus lines formed in parallel with each other such that they intersect the first bus lines with an insulation film formed on the first bus lines interposed therebetween, a first terminal section formed of the same material as that of either of the first and second bus lines, electrically connected to each of the first or second bus lines, and connected to one terminal of a semiconductor chip mounted on a surface of the base substrate; a second terminal section formed of the same material as that of the other of the first and second bus lines and connected to another terminal of the semiconductor chip; a third terminal section electrically connected to the second terminal section and provided at an end of the base substrate and to which signals are input from the outside; a connection wiring electrically connected to the first terminal section; and a common wiring electrically connected to the first or second bus lines through the connection wiring and provided at an end of the base substrate in a location that is removed during chamfering.

DESCRIPTION OF THE PREFERRED EMBODIMENTS

[First Embodiment]

Figure 1:
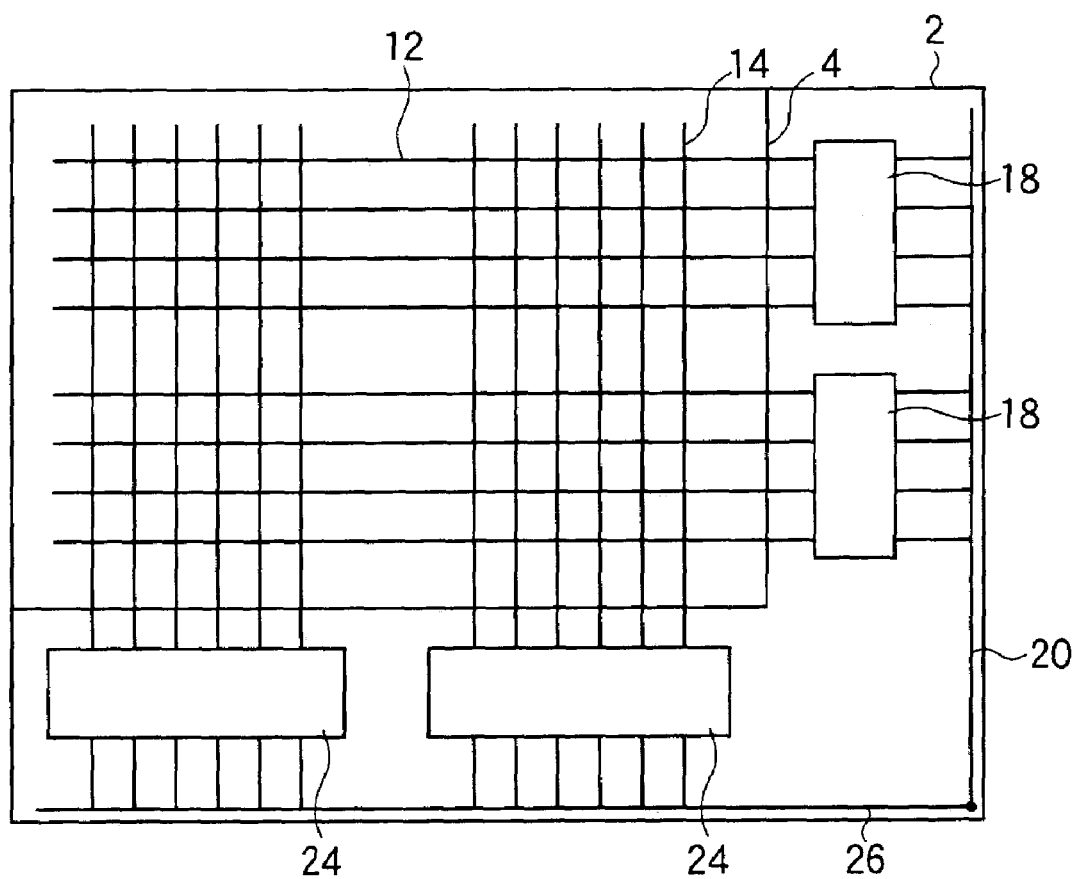
FIG. 1 shows a configuration of a liquid crystal display according to a first embodiment of the invention.

A description will now be made with reference to FIGS. 1 to 3 on a substrate for a liquid crystal display, a liquid crystal display having the same, and a method of manufacturing the same according to a first embodiment of the invention. FIG. 1 shows a schematic configuration of a liquid crystal display in the present embodiment. As shown in FIG. 1, the liquid crystal display has a structure formed by combining a TFT substrate (base substrate) 2 on which a TFT device and a pixel electrode are formed in each pixel region and an opposite substrate 4 on which color filters (CFs) are formed in a face-to-face relationship and sealing a liquid crystal between the substrates 2 and 4.

The TFT substrate 2 is formed with a plurality of gate bus lines 12 extending in the horizontal direction of the figure in parallel with each other and a plurality of drain bus lines 14 extending in the vertical direction in the figure in parallel with each other such that they intersect the gate bus lines 12 with an insulation film formed on the gate bus lines 12 interposed therebetween.

FIG. 1 also shows common wirings 20 and 26 that are removed before the liquid crystal display is completed. The common wiring 20 formed of the same material as that of the gate bus lines 12 is provided at the right end of the gate bus lines 12 in the figure. The common wiring 20 is electrically connected to each of the gate bus lines 12. The common wiring 26 formed of the same material as that of the drain bus lines 14 is provided at the bottom end of the drain bus lines 14 in the figure. The common wiring 26 is electrically connected to each of the drain bus lines 14. The common wiring 20 and the common wiring 26 are electrically connected to each other through a contact hole that is not shown formed by providing an opening in the insulation film. As will be described later, the common wirings 20 and 26 are removed when edges of the TFT substrate 2 are polished and chamfered at a chamfering step. While the common wirings 20 and 26 are directly connected to the bus lines 12 and 14 in the present embodiment, they may be connected through non-linear devices such as TFTs or a high resistance material.

Driver ICs 18 for driving the plurality of gate bus lines 12 are mounted at the right end of the TFT substrate 2 on a COG basis. Driver ICs 24 for driving the plurality of drain bus lines 14 are mounted at the bottom end of the TFT substrate 2 on a COG basis. The driver ICs 18 and 24 output scan signals and data signals to predetermined gate bus lines 12 or drain bus lines 14 based on predetermined signals output by a control circuit that is not shown.

Figure 2:
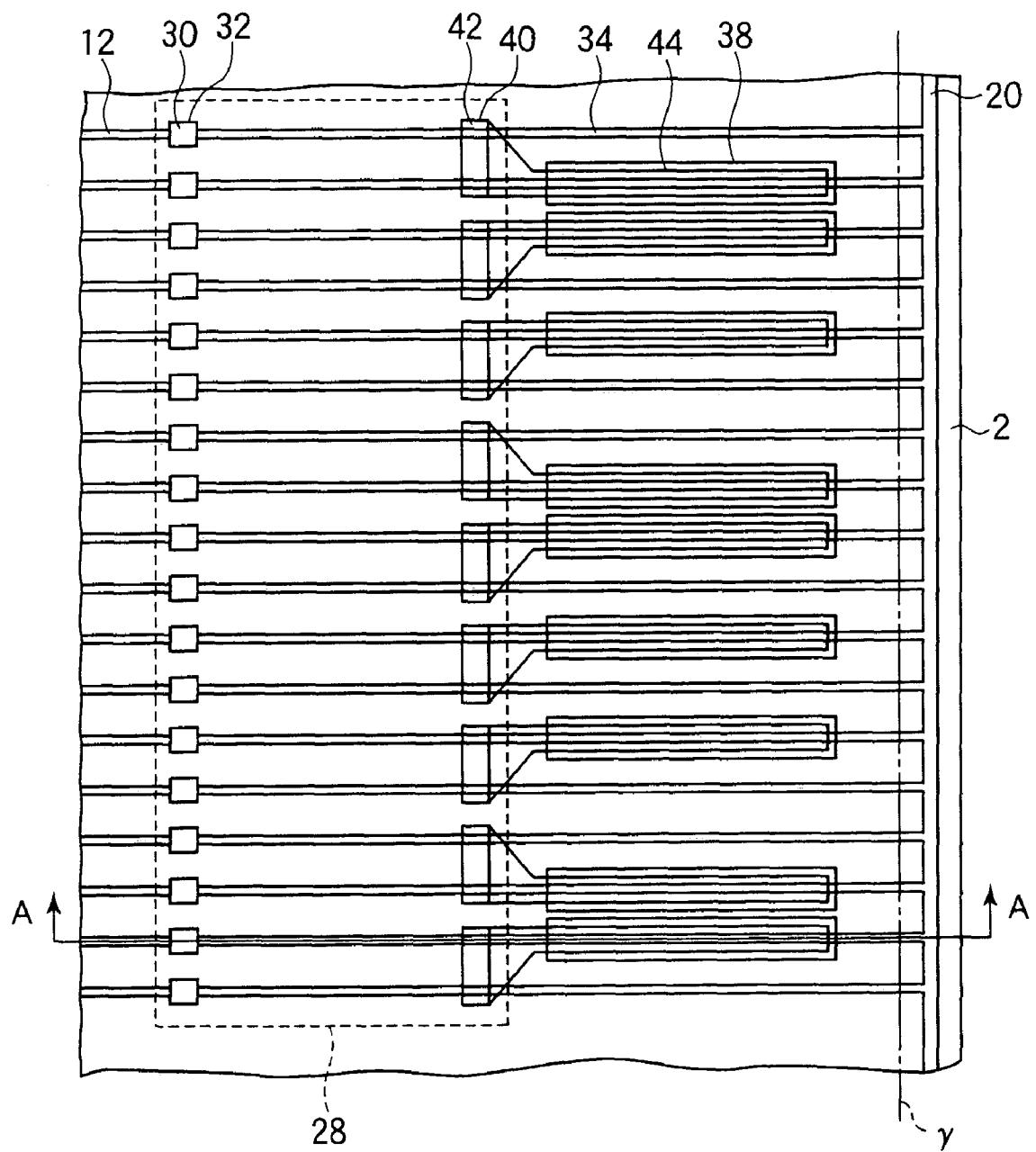
FIG. 2 shows a configuration of a major part of a substrate for the liquid crystal display according to the first embodiment of the invention.

FIG. 2 shows a configuration of the neighborhood of the common wring 20 of the TFT substrate 2 that is a substrate for a liquid crystal display according to the present embodiment. FIG. 3 is a sectional view of the TFT substrate 2 taken along the line A—A in FIG. 2. It is assumed here that the TFT substrate 2 shown in FIGS. 2 and 3 has not been subjected to the chamfering step for polishing edges of the substrate yet. As shown in FIGS. 2 and 3, the TFT substrate 2 has driver IC mounting areas 28 located inside the common wiring 20, driver ICs 18 being mounted in the areas 28 on a COG basis at a subsequent step for mounting driver ICs. Terminal sections 30 (first terminal sections) to which signals from the driver ICs 18 are input are formed at the right end of the gate bus lines 12 in the figure. Protective conductive films 32 constituted by transparent conductive films such as ITOs are formed on the terminal sections 30. The protective conductive films 32 are electrically connected to the terminal sections 30 through contact holes formed by providing openings in an insulation film 70 (including the protective films) on the terminal sections 30. The terminal sections 30 are electrically connected to the common wiring 20 through connection wirings 34 extending in the horizontal direction of FIG. 2 similarly to the gate bus lines 12. The terminal sections 30, the connection wirings 34 and the common wiring 30 are formed on a glass substrate 10 from the same material as that of the gate bus lines 12 at the same time when the gate bus lines 12 are formed.

Terminal section 44 (third terminal sections) to which external signals are input are formed on the TFT substrate 2. Protective conductive films 38 constituted by transparent conductive films such as ITOs are formed on the terminal sections 44. The protective conductive films 38 are electrically connected to the terminal sections 44 through contact holes formed by providing openings in the insulation film 70 on the terminal sections 44. Terminal sections 42 (second terminal sections) for outputting signals input from the outside to the driver ICs 18 are formed on the TFT substrate 2. Protective conductive films 40 constituted by transparent conductive films such as ITOs are formed on the terminal sections 42. The protective conductive films 40 are electrically connected to the terminal sections 42 through contact holes formed by providing openings in the insulation film 70 on the terminal sections 42. The terminal sections 44 and 42 are formed of the same material as that of the drain bus lines 14 at the same time when the drain bus lines 14 are formed.

The driver ICs 18 mounted in the driver IC mounting areas 28 on a COG basis are connected to the protective conductive films 32 on the terminal sections 30 through bumps 36 and are connected to the protective conductive films 40 on the terminals 42 through bumps 37.

In the present embodiment, the terminal sections 44 for inputting external signals and the terminal sections 42 for outputting the signals to the driver ICs 18 and 24 are constituted by a conductive layer that is different from the gate bus lines 12 and the common wiring 20. As a result, the gate bus lines 12 can be connected to the common wiring 20 through the connection wirings 34 even when the common wiring 20 is provided in a location that is removed at the chamfering step. This makes it possible to prevent static damage to TFT devices up to the chamfering step. Further, there is no increase in steps for manufacturing the TFT substrate 2. Furthermore, since the terminal sections 30, 42 and 44, the connection wirings 34 and the common wiring 20 are constituted by a plurality of conductive layers to reduce area limitations, which makes it easy to lay out wirings on the TFT substrate 2 at a designing step and allows designs with thin frames.

Figure 3:
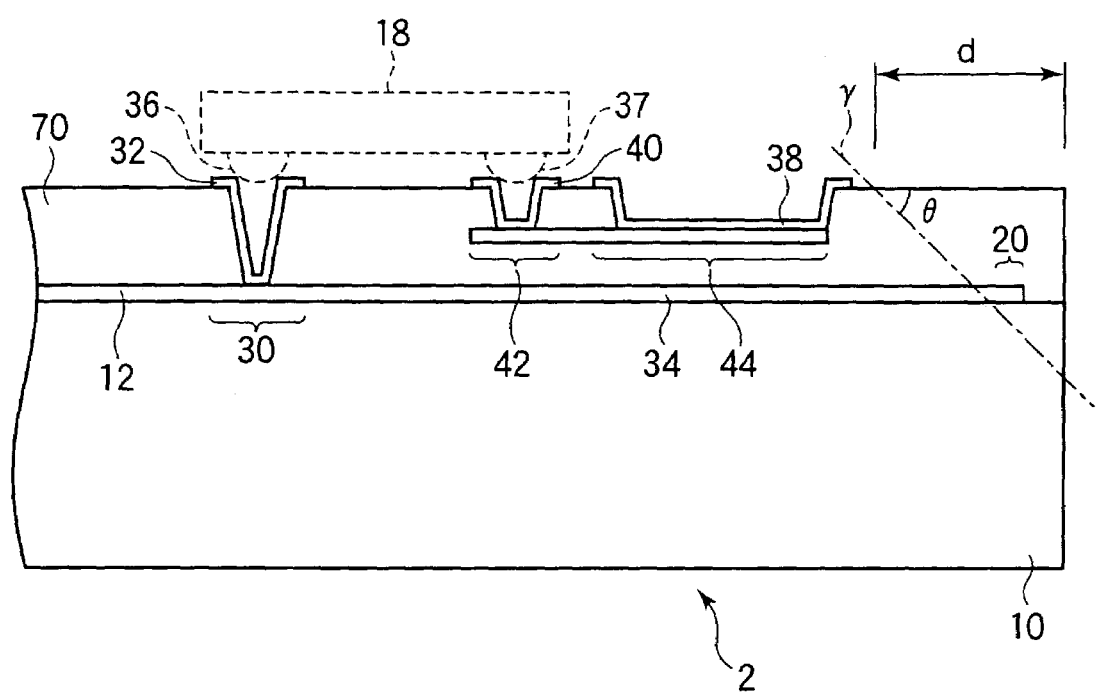
FIG. 3 is a sectional view of the substrate for the liquid crystal display taken along the line A—A in FIG. 2.

Although not shown, in the vicinity of the common wiring 26 connected to the drain bus lines 14, a configuration is employed in which the conductive layers are reversed from their relationship in the configuration shown in FIG. 3. Specifically, the first terminal sections to which signals from the driver ICs 24 are input, the connection wirings for connecting the first terminal sections and the common wiring 26, and the common wiring 26 are formed of the same material as that of the drain bus lines 14 at the same time when the drain bus lines 14 are formed. The third terminal sections to which signals are input from the outside and the second terminal sections for outputting the signals input from the outside to the driver ICs 18 are formed of the same material as that of the gate bus lines 12 at the same time when the gate bus lines 12 are formed. However, the connection wirings for connecting the first terminal sections and the common wiring 26 must be routed such that they do not overlap the terminal sections 42 and 44 when viewed in a direction perpendicular to the substrate surface. The drain bus lines 14 may be switched to the layer in which the gate bus lines 12 are formed inside the first terminal sections, which provides a configuration that is similar to the configuration shown in FIG. 3 even in the vicinity of the common wiring 26.

Figure 7:
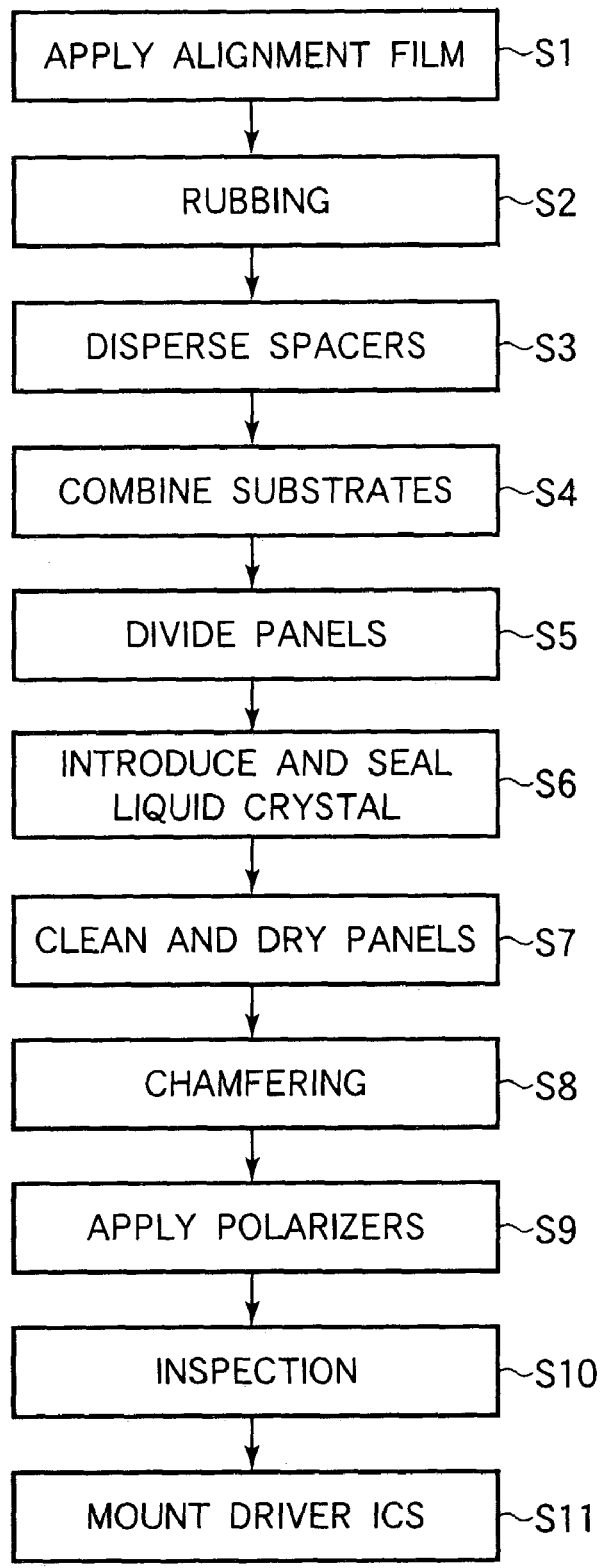
FIG. 7 is a flow chart showing steps of manufacturing a liquid crystal display.
Figure 8:
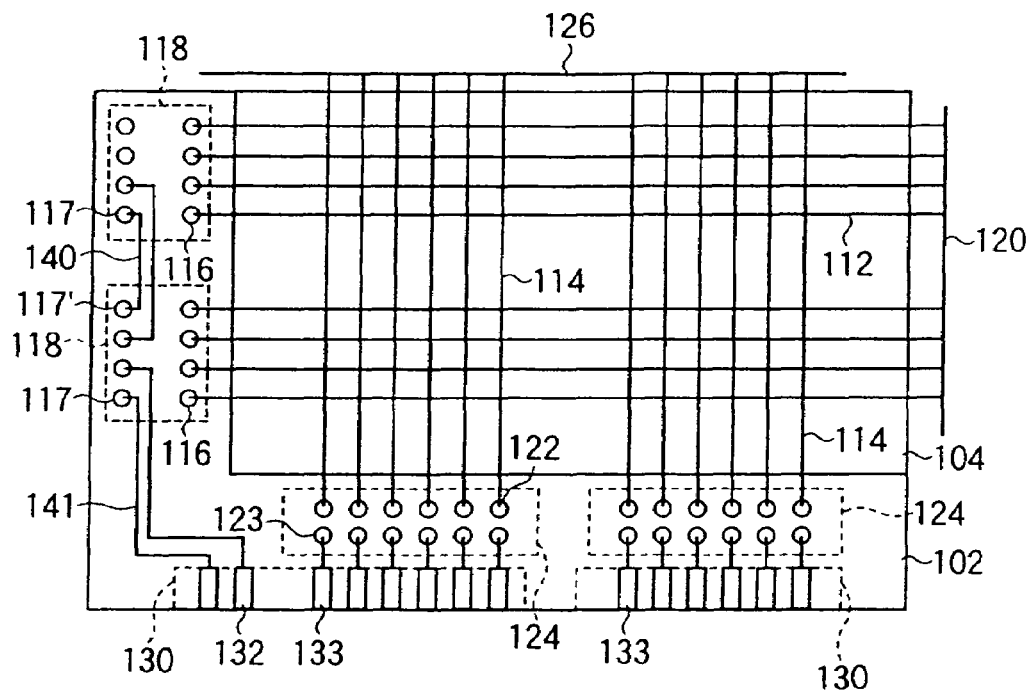
FIG. 8 shows a configuration of a liquid crystal display according to the related art.
Figure 9:
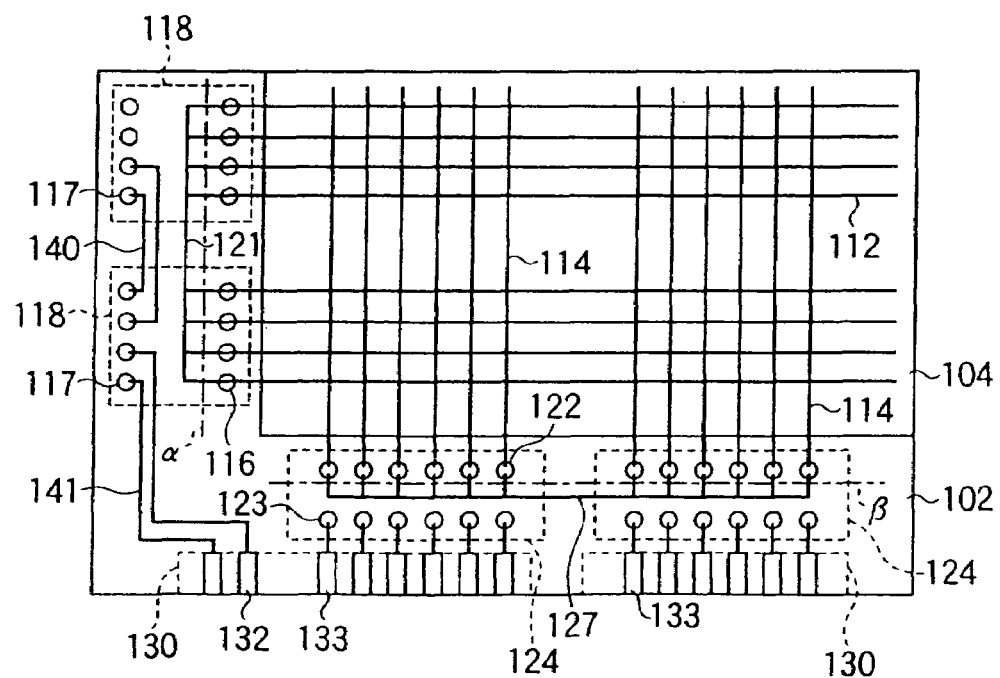
FIG. 9 shows another configuration of a liquid crystal display according to the related art.
Figure 10:
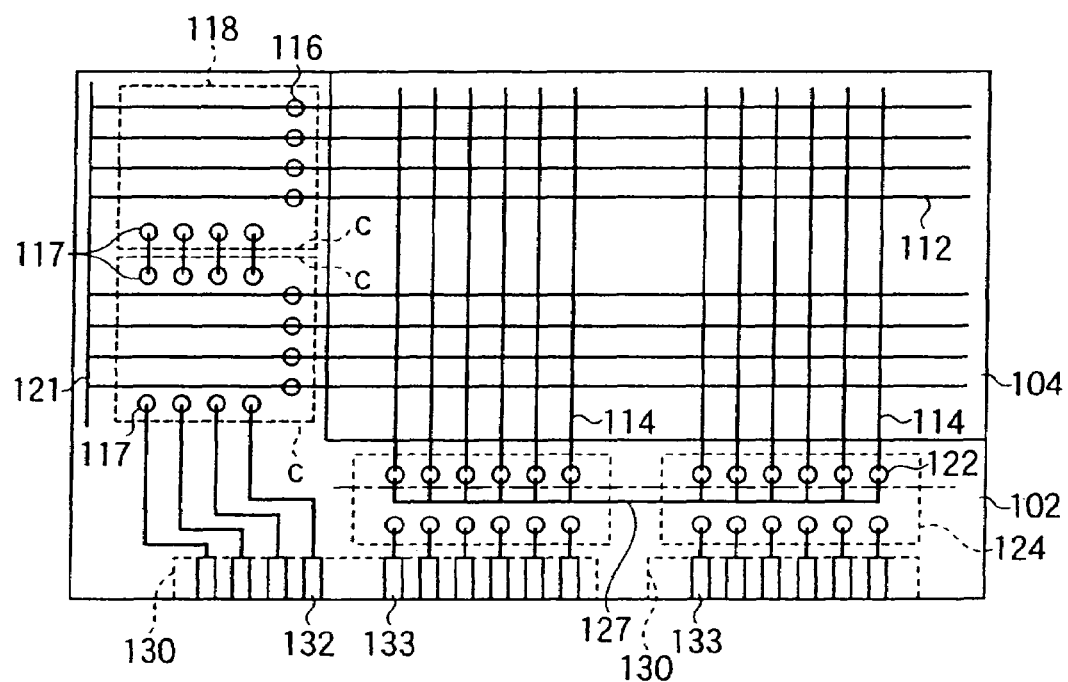
FIG. 10 shows still another configuration of a liquid crystal display according to the related art.

A method of manufacturing the liquid crystal display according to the present embodiment will now be described with reference to FIG. 7 which has already been referred to. First, alignment films are applied to surfaces (opposite surfaces) of the TFT substrate 2 and opposite substrate 4 that have been fabricated at respective processes (step S1 in FIG. 7). Next, a rubbing process is performed on the alignment films on both of the substrates 2 and 4 as occasions demand (step S2). Then, spherical spacers are dispersed on the opposite substrate 4, for example (step S3). A sealing material is then applied to the periphery of the TFT substrate 2 for each panel for example, and the substrates 2 and 4 are combined to fabricate a combined substrate (step S4). Next, each of the substrates 2 and 4 is cut into a predetermined configuration to divide the combined substrate into individual panels (step S5). At this time, the bus lines 12 and 14 on the TFT substrate 2 are electrically connected to each other by common wirings 20 and 26 formed at ends of the TFT substrate 2. A liquid crystal is then introduced into and sealed a gap between the combined substrates thus divided to fabricate liquid crystal display panels (step S6).

The liquid crystal panels are then cleaned to remove any portion of the liquid crystal that has stuck to the surface of the liquid crystal display panels, and the panels are dried thereafter (step S7). Next, edges of each of the substrates 2 and 4 are polished with a chamfering apparatus to chamfer them in order to prevent cracking and breakage at cut surfaces of the glass substrates 10 (step S8). Thus, edge sections of the TFT substrate 2 outside the line γ shown in FIGS. 2 and 3 are removed to remove the common wirings 20 and 24 formed at the edges of the substrate 2. The edges of the substrate are at a distance d toward the substrate surface that is, for example, 0.35±0.1 mm from the line γ, and the polishing is performed at an angle θ that is 45° to the substrate surface, for example. Although not shown, the back side (bottom side in FIG. 3) of the TFT substrate 2 is also chamfered similarly. A polarizer is then applied to each of outer surfaces of the liquid crystal panels (step S9). The polarizers are provided such that their polarization axes are substantially orthogonal to each other. A display inspection is then conducted on the liquid crystal display panels (step S10). The driver ICs 18 and 24 are then mounted on a COG basis on a surface of the TFT substrate 2 (step S11). Liquid crystal displays according to the present embodiment are completed through the above-described steps.

In the present embodiment, the common wirings 20 and 26 are removed at the chamfering step (step S8) instead of the panel dividing step (step S5). This makes it possible to prevent TFT devices from being damaged by static electricity that is generated at the liquid crystal introducing and sealing step (step S6) and the panel cleaning and drying step (step S7).

[Second Embodiment]

Figure 4:
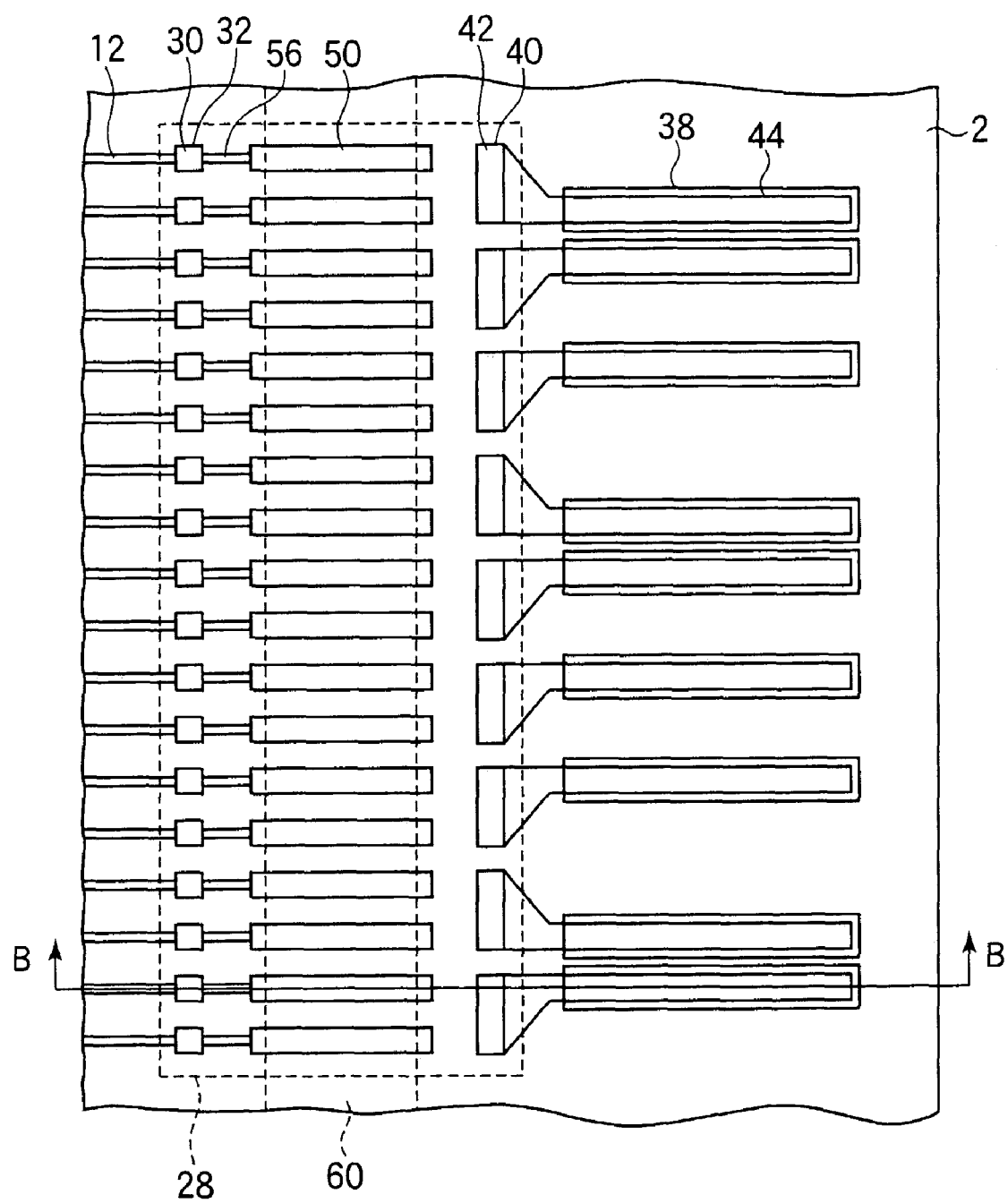
FIG. 4 shows a configuration of a major part of a substrate for a liquid crystal display according to a second embodiment of the invention.
Figure 5:
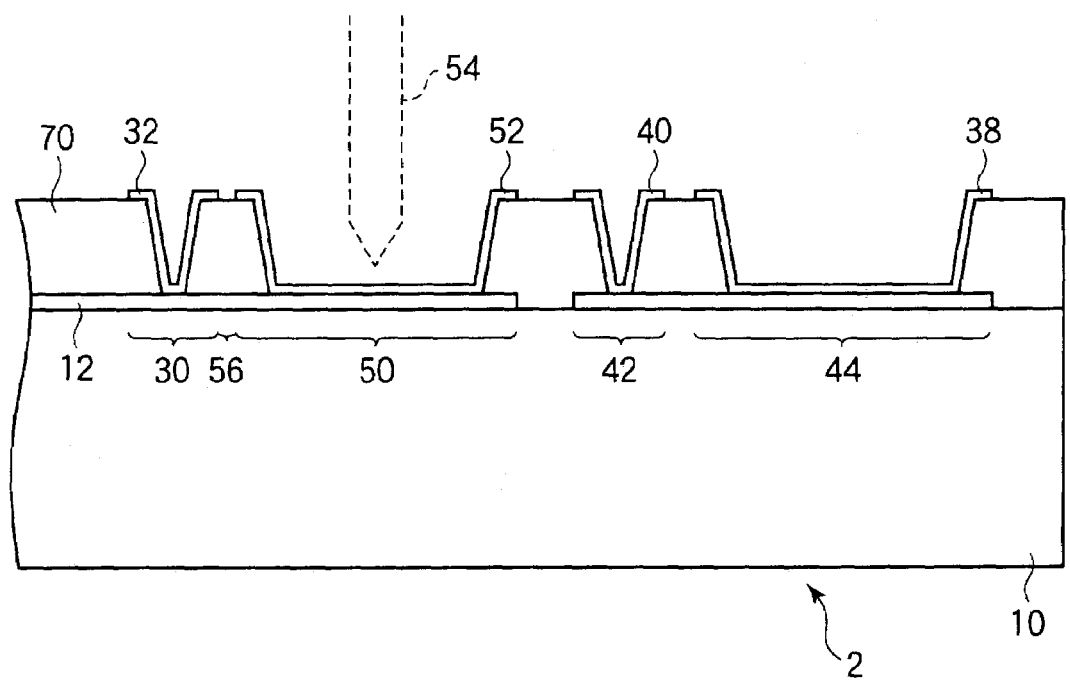
FIG. 5 is a sectional view of the substrate for a liquid crystal display taken along the line B—B in FIG. 4.

A description will now be made with reference to FIGS. 4 and 5 on a substrate for a liquid crystal display, a liquid crystal display having the same, and a method of manufacturing the same according to a second embodiment of the invention. FIG. 4 shows a configuration of the neighborhood of a driver IC mounting area 28 of a TFT substrate 2 that is a substrate for a liquid crystal display according to the present embodiment. FIG. 5 is a sectional view of the TFT substrate 2 taken along the line B—B in FIG. 4. As shown in FIGS. 4 and 5, the TFT substrate 2 of the present embodiment has terminal sections 50 (fourth terminal sections)in the driver IC mounting area 28. For example, protective conductive films 52 constituted by transparent conductive films such as ITOs are formed on the terminal sections 50. The protective conductive films 52 are electrically connected to the terminal sections 50 through contact holes formed by providing openings in an insulation film 70 on the terminal sections 50. The terminal sections 50 are electrically connected to terminal sections 30 through connection wirings 56 extending in the horizontal direction of FIG. 4 similarly to gate bus lines 12. The terminal sections 30, the connecting wirings 56 and the terminal sections 50 are formed of the same material as that of the gate bus lines 12 at the same time when the gate bus lines 12 are formed. In the present embodiment, terminal sections 42 and 44 are also formed of the same material as that of the gate bus lines 12 at the same time when the gate bus lines 12 are formed.

Although not shown, the TFT substrate 2 has similar fourth terminal sections in a driver IC mounting area in which driver ICs 24 for drain bus lines 14 are mounted. The terminal sections are electrically connected to the drain bus lines 14 through connection wirings. The terminal sections are formed of the same material as that of the drain bus lines 14 at the same time when the drain bus lines 14 are formed.

A method of manufacturing the liquid crystal display according to the present embodiment will now be described with reference to FIG. 7. In the present embodiment, common wirings are removed at a panel dividing step (step S5 in FIG. 7). Thereafter, a panel cleaning and drying step (step S7) is followed by an operation of applying paste 60 having conductivity (hereinafter referred to as "conductive paste") in the vertical direction in FIG. 4 such that the plurality of terminal sections 50 are connected. The conductive paste 60 is manufactured, for example, by mixing a resin with carbon and is applied using a paste applying apparatus. The applied conductive paste 60 dries and sets. Thereafter, the conductive paste 60 that has set is peeled off with tweezers prior to an inspection step (step S10). When the conductive paste 60 has a relatively high resistance, it may be peeled off before a driver IC mounting step (step S11) after the inspection step because the inspection can be conducted without peeling off the conductive paste 60. At the inspection step, probe pins 54 are put in contact with the protective conductive films 52 on the terminal sections 50.

In the present embodiment, even after the common wirings are removed at the panel dividing step (step S5), the bus lines 12 and the bus lines 14 are electrically connected respectively after the panel cleaning and drying step (step S7) until the conductive paste 60 is peeled off. It is therefore possible to prevent TFT devices from being damaged by static electricity generated at laminating steps such as a polarizer applying step (step S9).

In the present embodiment, it is possible to prevent damage to the surface of the terminal sections 30 on which the driver ICs 18 are mounted because the inspection step is conducted by putting the probe pins 54 in contact with the terminal sections 50 (protective conductive films 52).

While the terminal sections 42 and 44 are formed of the same material as that of the gate bus lines 12 at the same time when the gate bus lines 12 are formed in the present embodiment, they may be formed concurrently with the formation of the drain bus lines 14 from the same material as in the first embodiment shown in FIG. 3. This makes it possible to connect the gate bus lines 12 to the common wiring even when the common wiring is provided in a location that is removed at a chamfering step (step S8). Thus, when the conductive paste 60 is applied prior to the chamfering step, static damage to TFT devices can be prevented until the conductive paste 60 is peeled off.

[Third Embodiment]

Figure 6:
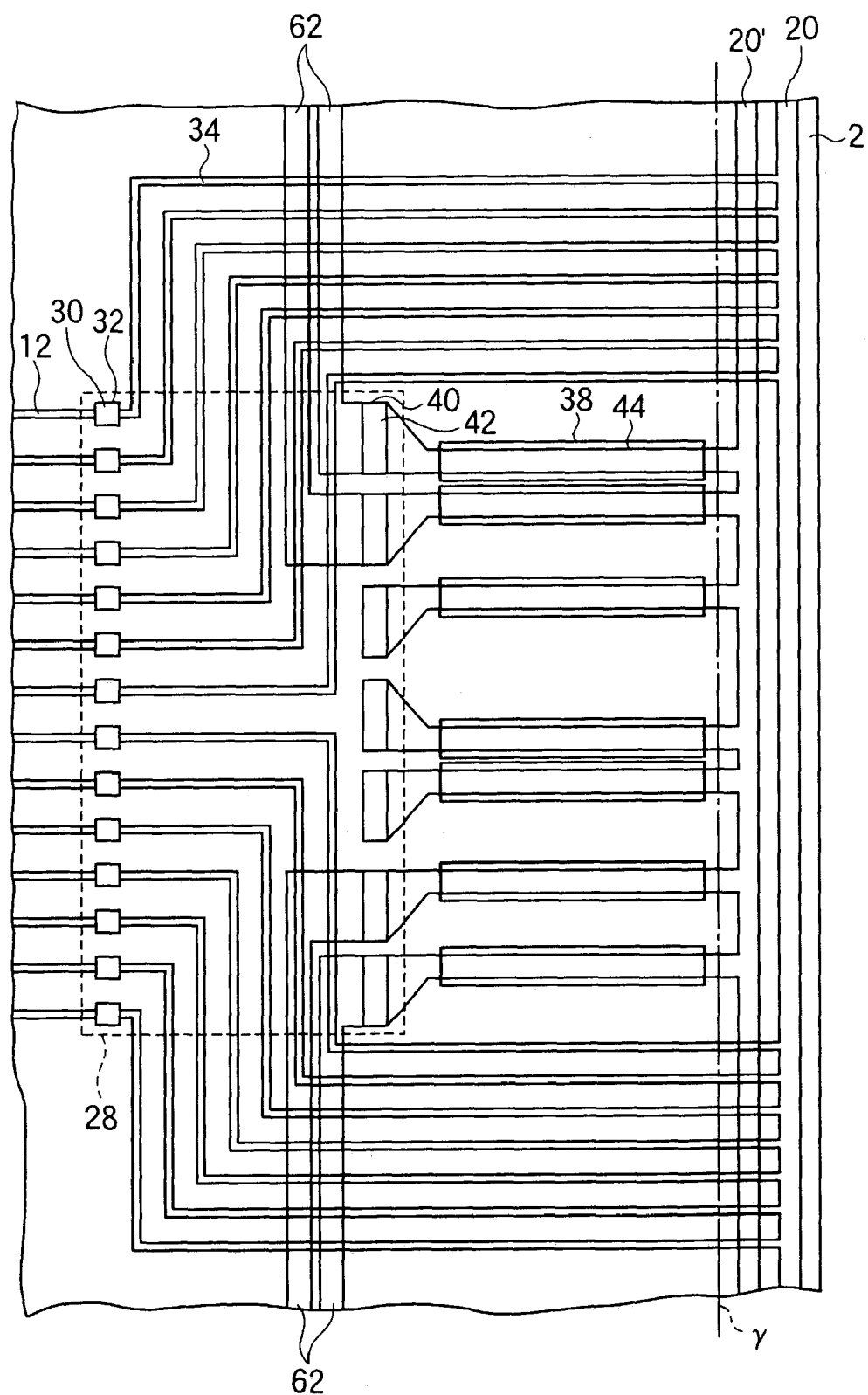
FIG. 6 shows a configuration of a major part of a substrate for a liquid crystal display according to a third embodiment of the invention.

A substrate for a liquid crystal display according to a third embodiment of the invention will now be described with reference to FIG. 6. FIG. 6 shows a configuration of the neighborhood of a driver IC mounting area 28 of a TFT substrate 2 that is a substrate for a liquid crystal display according to the present embodiment. As shown in FIG. 6, connection wirings 34 extend from shorter sides of the driver IC mounting area 28, bypass terminal sections 42 and 44, and connect to a common wiring 20. Some of the terminal sections 42 are connected to terminal sections 42 of another driver IC mounting area through in-panel wirings 62 that are formed concurrently with the formation of drain bus lines 14 from the same material. Thus, a plurality of driver ICs 18 mounted later are cascade-connected to the same. Furthermore, in the present embodiment, the plurality of terminal sections 44 are extended to an edge of the TFT substrate 2 and are each connected to a common wiring 20'. Thus, the plurality of terminal sections 44 are electrically connected. The common wirings 20 and 20' are removed at a chamfering step.

In the present embodiment, since the connection wirings 34 are formed such that they bypass the terminal sections 42 and 44, the two conductive layers overlap each other with an insulation film 70 interposed therebetween in a region that has a small surface area. This makes it possible to suppress the occurrence of product defects attributable to inter-layer shorting.

In the configuration according to related art, it has been impossible to prevent TFT devices from being broken by static electricity on the TFT substrate 2 on which a plurality of driver ICs are cascade-connected because it has been difficult to route the connection wirings 34 to the common wiring 20 via a bypass. In the present embodiment, however, it is possible to prevent TFT devices from being broken by static electricity even when the in-panel wiring 62 for cascade-connecting the plurality of driver ICs is formed because the connection wirings 34 can be easily routed via a bypass.

Furthermore, the plurality of terminal sections 42 and 44 are connected to the common wiring 20' in the present embodiment. Thus, the plurality of terminal sections 42 and 44 can be kept at the same potential, which makes it possible to provide liquid crystal displays that are less vulnerable to static electricity.

The invention is not limited to the above-described embodiments and may be modified in various ways.

For example, while substrates for a bottom gate type liquid crystal display have been described as examples in the above embodiments, the invention is not limited to them and may be applied to a substrate for a top gate type liquid crystal display. The invention may be applied to both of processes for channel-etched type TFTs and etching stopper type TFTs.

As described above, the invention makes it possible to prevent static damage to TFT devices and to provide liquid crystal displays having a thin frame.

What is claimed is:

1. A substrate for a liquid crystal display, comprising:
   first bus lines formed in parallel with each other on a base substrate;
   second bus lines formed in parallel with each other such that they intersect the first bus lines with an insulation film formed on the first bus lines interposed therebetween;
   a first terminal section formed of the same material as that of either of the first and second bus lines, electrically connected to each of the first or second bus lines, and connected to one terminal of a semiconductor chip mounted on a surface of the base substrate;
   a second terminal section formed of the same material as that of the other of the first and second bus lines and connected to another terminal of the semiconductor chip;
   a third terminal section electrically connected to the second terminal section, and which is provided at an end of the base substrate and to which signals are input from the outside;
   a connection wiring electrically connected to the first terminal section; and
   a common wiring electrically connected to the first or second bus lines through the connection wiring and provided at an end of the base substrate in a location that is removed during chamfering.

2. A substrate for a liquid crystal display according to claim 1, wherein the common wiring is provided at an end of the base substrate where the semiconductor chip is mounted.

3. A substrate for a liquid crystal display according to claim 1, further comprising a fourth terminal section connected to each of the first and second bus lines and formed in the region where the semiconductor chip is mounted.

4. A liquid crystal display comprising:
   a first substrate;
   a semiconductor chip mounted on a surface of the first substrate;
   a second substrate provided opposite to the first substrate and combined with the same; and
   a liquid crystal sealed between the first and second substrates;
   wherein the first substrate is a substrate for a liquid crystal display according to claim 1.

* * * * *